United States Patent [19]
Layman

[15] 3,728,062
[45] Apr. 17, 1973

[54] FORMING ARTICLES FROM SHEET MATERIAL

[75] Inventor: Lee R. Layman, Windsor Locks, Conn.

[73] Assignee: Monsanto Company, St. Louis, Mo.

[22] Filed: April 2, 1970

[21] Appl. No.: 25,186

[52] U.S. Cl. .................................. 425/291, 425/385
[51] Int. Cl. ............................................. B29c 17/00
[58] Field of Search .... 18/19 R, 19 BM, 19 BE, 19 F, 18/35; 264/89, 322; 425/385, 109, 291

[56] References Cited

UNITED STATES PATENTS

| | | | |
|---|---|---|---|
| 3,518,334 | 6/1970 | Carrigan et al. | 18/19 R X |
| 3,166,790 | 1/1965 | Keyes | 18/19 F |
| 3,271,816 | 9/1966 | Schneider | 18/19 F UX |

*Primary Examiner*—Robert L. Spicer, Jr.
*Attorney*—James C. Logomasini, Michael J. Murphy and Neal E. Willis

[57] ABSTRACT

In a trim in place thermoforming process for shaping articles from sheet material wherein a blade penetrates the sheet around the periphery of each article to facilitate later removal, method and apparatus improvements wherein limited portions of the leading surface of the blade are introduced into the sheet to a lesser extent than that of the remainder of the leading surface to form frangible tabs in the sheet adjacent side portions of the article which extend in the direction of sheet advancement, thereby reducing the criticality of the sheet thickness along the line of penetration for retaining the articles attached to the sheet. To form the tabs, the leading surface of the blade has indentations therein which are preferably oriented at an acute angle to the adjoining surface of the article being formed, as opposed to the adjoining surface of the portion of the sheet remaining after the article is removed.

2 Claims, 4 Drawing Figures

PATENTED APR 17 1973　3,728,062
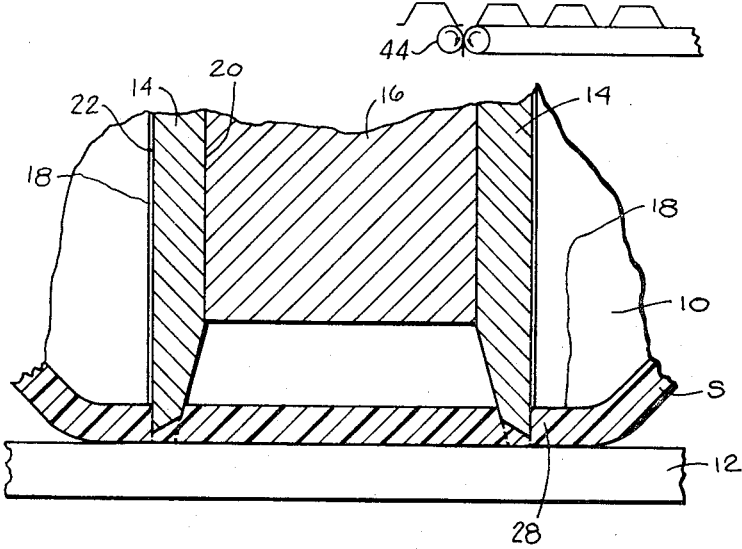
FIG. 1
FIG. 4
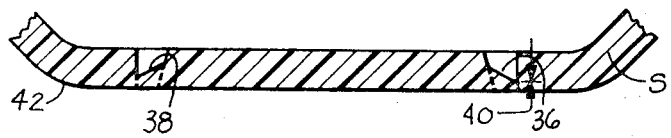
FIG. 2
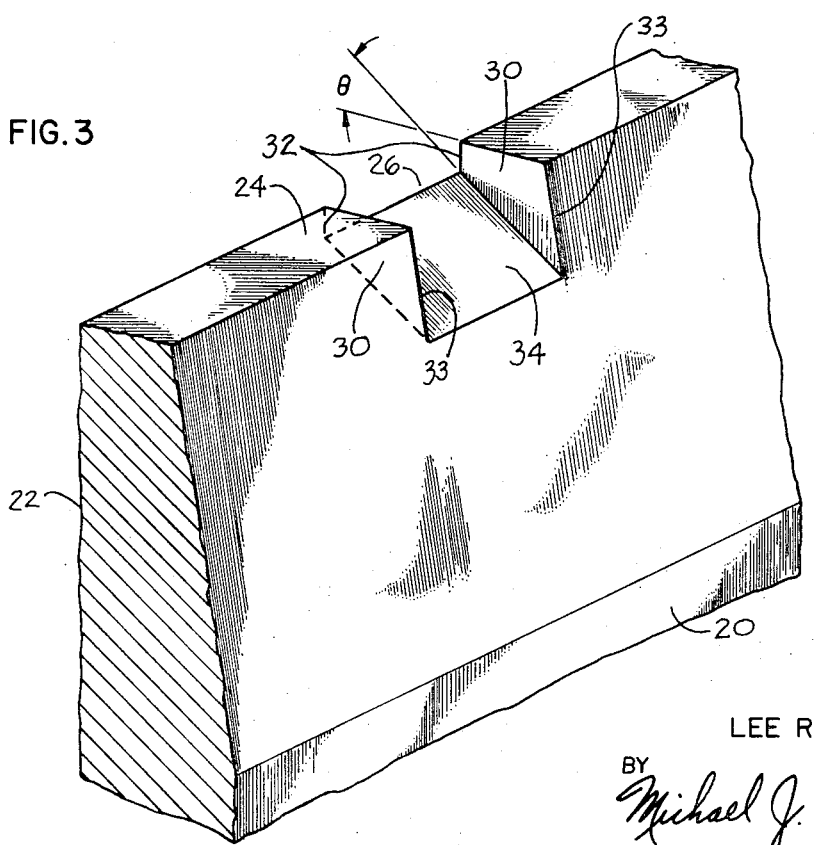
FIG. 3
INVENTOR.
LEE R. LAYMAN
BY Michael J. Murphy
ATTORNEY ic sheet material, and in particular to im-
FORMING ARTICLES FROM SHEET MATERIAL

BACKGROUND OF THE INVENTION

This invention relates to the forming of articles from thermoplastprovements in retaining articles attached to the sheet after trimming and prior to separation in a trim in place thermoforming operation.

Several types of forming are known for simultaneously shaping plural articles in recurring cycles from portions of a generally continuous plastic sheet. One technique is by pneumatic pressure differential forcing of portions of a heated area of the sheet against the surfaces of mold cavities to form depressions therein using sealing blades to hold the pressure in each mold during forming, followed by a creasing or scoring of the sheet around the formed articles at the seal while still in the press by means of the blades advancing further into the sheet which is trapped against an opposing firm surface. This creasing corresponds to what is known as a trimming step, in that the blade penetrates almost but not entirely through the full thickness of the sheet, the unpenetrated portion of the thickness permitting transfer of the articles out of the mold and away from the forming station while still held in the sheet. Thereafter, the sheet with the articles retained therein is passed across a stripping surface such as a roll for the purpose of shearing the articles out of the sheet along the previously formed crease or score lines, whereupon the scrap sheet, or web as it is known in the art, is accumulated or immediately reprocessed as desired. U.S. Pat. No. RE 26,413 illustrates a machine operating on these principles. This type of forming is referred to as a type of trim in place thermoforming, as opposed to post trim thermoforming wherein a separate trimming press is required downstream of the forming station to separate the articles from the sheet, or the trim in place technique wherein the articles are entirely severed from the sheet while in the forming press and then must be individually removed therefrom. From the standpoint of speed and economy, trim in place thermoforming of the first mentioned variety is highly desirable since the portion of the sheet or web between the mold cavities is used to transport the articles, for example containers, out of the forming press while the articles are still attached therein.

As can be expected, the sheet contacting surfaces of the sealing blades acting against the opposing platen surface will become blunt with wear after numerous cycles of the equipment. Also, over a period of time, one or more blades in a press may need replacing whereas the remainder might not, with the result being that the leading surfaces of the blades may not all be aligned in a common plane after reassembly. Either of these conditions will produce variable levels of sheet penetration during the second trimming stroke of the sealing blades. If substantial portions of the sheet have not been sufficiently penetrated around each article, when it is directed across the stripping roll the articles instead of cleanly snapping out of the sheet do so only partially and tend to undesirably follow the web, or else discharge erratically from the sheet in a misalinged manner.

On the other hand, if penetration is excessive, rather than stripping out of the mold cavity as is desired when the platen on which the molds are mounted moves away after the forming cycle, the articles tend to haphazardly and prematurely break away from the sheet and hang up in the molds. Also, as the rate of sheet advance is increased to reduce cycle time and increase capacity, the rate of acceleration and deceleration of the sheet during indexing between the forming station and the stripping roll is increased with a consequent greater risk of premature article separation if sheet penetration has been excessive.

Each time any of these problems occurs, the system, of course, must be shut down for clearing with a corresponding resulting loss in output. The extent of the stroke of the platen on which the blades are mounted must be very closely controlled at all times to obtain just the right amount of penetration for optimum article separating conditions and this is especially difficult to do when sheet gage is varied on changing from one product weight to another. Close operator attention is usually necessary, and this is directly contrary to the objective of an automated system.

SUMMARY OF THE INVENTION

Now there have been discovered unique apparatus improvements in a trim in place thermoforming system for overcoming the above mentioned deficiencies of the prior art.

Accordingly it is a principal object of this invention to provide apparatus improvements for substantially increasing the capacity of a trim in place thermoforming system.

Another object of this invention is to provide apparatus improvements applicable to the trimming phase of such a system.

A further object of this invention is to provide apparatus improvements for reducing the criticality of the extent of sheet penetration by the severing element as it relates to holding of the articles in the sheet after formation and prior to separation from the sheet.

A particular object of this invention is to provide apparatus improvements in the cutting or severing element of a trim in place thermoforming assembly.

Other objects will in part be obvious and will in part appear hereinafter.

These and other objects are accomplished in a trim in place, thermoforming process for repeatedly forming articles from heated portions of a thermoplastic sheet by sealing each heated sheet portion around a mold, forcing each heated sheet portion within the seal against the mold to form the article, penetrating the sheet with a creasing surface around the periphery of each formed article along the line of prior sealing to form a line of penetration therein and advancing each sheet portion with the article attached therein across a stripping surface to separate each article from each sheet portion along the line of penetration, by providing the improvement which comprises introducing limited portions of the creasing surface into the sheet to a lesser extent than that of the remainder of the creasing surface during formation of said line of penetration to form frangible tabs on each side of the portion of the periphery of each article extending in the direction of advancing movement of the sheet portion, said tabs, because of said limited introduction, having a thickness greater than that of the thermoplastic along the remainder of the line of penetration, thereby reducing the criticality of sheet thickness along the line of penetration for retaining the articles attached to the sheet after forming and prior to article separation.

The means for sealing and penetrating the sheet includes a blade having a leading surface with formed depressions in portions of its periphery which are parallel to the mold sides extending in the direction of sheet advancement.

BRIEF DESCRIPTION OF THE DRAWING

In describing the overall invention reference will be made to the accompanying drawing in which:

FIG. 1 is a partial, sectional, elevational view of the improved apparatus of the present invention during the forming process;

FIG. 2 is a schematic, partial, elevational view of a portion of a sheet after forming and before article separation; and FIG. 3 is a partial perspective view of a form of the improved apparatus of the present invention; and FIG. 4 is a schematic view of a portion of the apparatus useful in the present invention.

DETAILED DESCRIPTION OF THE PREFERRED EMBODIMENT

Major, known components of a trim in place thermoforming system are shown and described in detail in U.S. Pat. No. RE 26,413, the disclosure of which is incorporated herein by reference. These components include a plurality of molds, each of which has a cavity conforming at least in part to the shape of the article being formed, means, such as pneumatic differential pressure, for forcing heated sheet portions from which articles are to be formed against the cavity surfaces, a cutting or sealing element, such as a blade, surrounding each mold for penetrating the sheet around the periphery of each article, and means, such as a piston driven endless chain, for advancing the sheet with the partially separated articles attached therein across a stripping surface such as a breaking roll 44 in FIG. 4 to release each article from the sheet.

Referring now to FIG. 1 of the present drawing, further portions of the apparatus are illustrated. Sealing and trimming are done in the forming press by moving a platen (not shown) on which the plurality of molds 10 are mounted, toward a rigid, opposed, supporting surface 12 with sheet S interposed therebetween. A separate blade 14 is fixedly mounted to the upper supporting platen around the periphery of each mold 10. Each blade has an end portion protruding slightly beyond its mold 10 toward supporting surface 12. Though the blades 14 are shown above sheet S, it should be obvious that their orientation could be reversed. A spacing member 16 is provided between adjoining blades. Each mold 10 has a forming surface which includes a cavity which conforms, at least in part, to the shape of the article being molded. Each mold 10, also has peripheral portions or sides, illustrated as 18, which extend in the direction of advancement of sheet S through the forming press. Considering this advancement with respect to the illustration of FIG. 1, sheet S is meant to be shown as moving toward the viewer. Each mold 10 also has peripheral portions or sides, not shown, which extend across (from left to right in FIG. 1) or perpendicular to the direction of sheet advancement through the press.

The article being formed in the illustrated embodiment is a relatively shallow packaging tray which is rectangular in cross section and which has a peripherally extending horizontal flange 28 at the upper end of its sides when seated in an upright position. Obviously, any article shape could be formed consistent with the sheet drawing limitations of the equipment. In situations where the article periphery, and consequently the article forming mold, is of a different shape, e.g., circular, the portions of the mold sides and of the blade which extend in the direction of sheet advancement through the press are considered to be those on either side of a planar center line taken through the article in the direction of sheet advancement.

Turning now to FIG. 3, the improved blade of the present invention has parallel inner and outer side portions 20 and 22, with the outer side 20 sloping toward inner side 22 adjacent the forward end portion of each blade 14, terminating short of intersection with inner side 22 so as to define a flat, sheet contacting leading surface 24. The rearward end portion of each blade 14 is conventionally secured to the supporting platen (not shown) as previously described. Leading surface 24 has depressions 26 formed therein in the portions of its periphery which are parallel to mold sides 18, the latter, as mentioned, extending in the direction of advancement of sheet S through the forming press. In the embodiment illustrated, one depression is shown for that portion of the blade periphery parallel to one mold side 18. However, it should be understood that a plurality of depressions may be formed in each of the peripheral portions parallel to mold side 18, particularly in forming large sized articles. No depressions, however, are formed in those portions of the blade periphery which are parallel to the mold side portions extending perpendicular to the direction of advancement of the sheet through the press.

In the illustrated embodiment, each depression 26 has a length extending in the direction of the blade periphery which is on the order of 1/16 inch. Each depression 26 is defined in part by angular surface 34 which is positioned at an acute angle to outer side 22 of each blade 14. Outer side 22, as shown, is the side of blade 14 which abuts each mold 18, as opposed to side 20 which abuts spacing member 16. In the drawing, this angle o is on the order of 30°. Each depression 26 is further defined by opposed vertical sides 30 which extend perpendicularly away from leading surface 24 and which each have relatively short vertically extending edges 32 at one end and longer edges 33 due to angular surface 34 at the other end.

In operation, and as described in part in U.S. Pat. No. RE 26,413, articles are repeatedly formed from heated portions of a generally continuous thermoplastic sheet being advanced through the forming press which includes the just described components. Each sheet portion is allowed to contact the surface of lower platen 12 which is at an elevated temperature by reason of its having conventional electrical resistance heaters, not shown, embedded therein, so as to bring each portion of sheet S which is to define an article up to molding temperature. The upper platen on which molds 18 are mounted is then caused to descend toward supporting surface 12 such that leading surface 24 of each blade 14 contacts hot moldable sheet S and seals each heated sheet portion around its corresponding mold 10 between surface 24 and member 12. Thereafter, each portion of sheet S within the seal is forced into contact with the article defining surface of each mold so as to form the article. Immediately thereafter the platen is again caused to descend for a second time such that blades 14 advance into sheet S around the periphery of each formed article along the exact line of prior sealing, in order to form line 36 of penetration therein which extends through the full thickness of the sheet in the areas other than where indentations 26 are located. However, limited portions of leading or creasing surface 24 corresponding to the surfaces defining indentations 26 are introduced into sheet S to a lesser extent than that of the remainder of surface 24 during formation of penetration line 36 so as to form angularly oriented frangible tabs 38 in the sheet adjacent the extremity of each side of the formed tray which extends in the direction of advancing movement of sheet S through the forming press. Thus, the amount by which each tab 38 is attached to the adjoining article corresponds to surface 32 of indentation 26, is represented by 40 in FIG. 2 and is on the order of about 10 percent of the total sheet thickness. With the prior art approach wherein tabs were not employed, penetration was set to be substantially greater i.e., on the order of 98-99 percent of the sheet thickness and around the full periphery, in order to compensate for those areas which were or would be out of control. Accordingly, tabs 38 because of indentations 26 have a thickness greater than that of the thermoplastic along the remainder of the line of penetration, the latter preferably being zero, the blade having passed entirely through the sheet in this area. Since indentation 26 is in part formed by angular surface 34 in the illustrated embodiment, each tab 38 accordingly forms an acute angle with respect to the adjoining surface 42 of the article being formed, as opposed to the adjoining surface of the web portion of the sheet opposite member 16 between adjacently formed articles.

After the second stroke of the platen, which is known in the art as the trimming stroke, has been carried out, the platen is caused to reciprocate upwardly away from support member 12, the sheet advance member is activated to move each sheet portion with the formed articles attached therein at tabs 38 out of the forming press and across a downstream stripping surface such as a horizontally extending edge or roll. As the sheet is passing over the roll, for example in a downward direction, the formed article because of its inherent strength will proceed in the direction of sheet advancement just upstream of the stripping surface, whereas the portion of the sheet intermediate the articles will follow the roll surface because of its flexibility. Accordingly each article will shear away from the surrounding portion of the sheet at frangible tabs 38.

As an important facet of the present invention, shearing of tabs 38 (FIG. 2) because of their angular configuration will be along the short side thereof or in other words along the edge of the formed article as opposed to along the edge of the web between adjacent articles. The remainder of the article has been separated from the sheet in the forming press during the trim stroke of the mold platen. In this way the tabs remain attached to the web rather than the article, and a separate downstream step to remove them from the articles is avoided. The web with the articles removed therefrom then proceeds in a conventional manner through the nip of takeup rolls where it is recovered for reuse.

The above description and particularly the drawing are set forth for purposes of illustration only and are not to be taken in a limited sense.

The indentations in the leading, sheet contacting surface of the blade of the present invention may vary in cross sectional configuration from that illustrated. The surfaces defining the indentations may be rounded at their intersections with each other in order to facilitate machining. Depending on the nature of the article being formed, the angular configuration of the indentations and resulting tabs may not be necessary and the indentation could be rectangular, semi-circular etc. when it is unimportant as to whether the tabs remain with the article or the web after separation of the article from the sheet. However, when the article is a packaging container, such as a tray, which will come in contact with human hands and may, for example, be overwrapped, it is highly desirable that the edge of the article be relatively free of projections, since these may cut fingers and prematurely fracture the overwrap. Accordingly, the angular configuration of the illustrated embodiment is particularly preferred in such an application, since it has been found that the tabs remain with the web rather than the article after passing across the stripping surface since the thickness of the tab at its joint with the web is greater than at its joint with the article. This angle should be between 20° to 60° in order to obtain consistent separation along the tab joint with the article.

The length of the blade indentations in a direction perpendicular to the depth, must not be excessive, or else the strength of the tabs will be too great for shearing at the stripping station. This length must be at least equal to or greater than the maximum depth, and this length is preferably maintained at between one to 50 times the maximum depth of the indentations.

With respect to the location of the indentations in the periphery of the blade, as mentioned, they should be located along the sides of the article or mold which extend in the direction of sheet advancement as opposed to any corners or to the leading and trailing sides of the articles which extend generally in a direction perpendicular to that of sheet advancement. This is so since shearing is facilitated when it occurs along the line of movement of the sheet as opposed to across the line of movement.

Also, when a number of closely spaced adjacent rows of articles are being formed in the press which extend in the direction parallel to sheet advancement, the indentations in adjacent blades should preferably be staggered with respect to each other rather than aligned since in the latter case wherein all articles would be sheared from the sheet at substantially the same time, there is a distinct possibility of fracturing the resulting web because of the stress concentration buildup in the web at these points. However, under certain conditions, for example when adjacent rows are well spaced from each other, this may not occur.

It is obvious that many variations may be made in the embodiment set forth herein without departing from the spirit and scope of the invention as hereinafter claimed.

I claim:

1. In a trim in place, thermoforming apparatus for repeatedly forming packaging containers from heated portions of a thermoplastic sheet being advanced through the apparatus which includes a container mold having sides extending in the direction of sheet advancement, means for forcing each heated sheet portion into said mold to form the containers, means surrounding said mold for sealing each heated sheet portion against an opposing rigid surface prior to forming and for penetrating the sheet around the periphery of each formed container along the line of prior sealing to form a line of penetration therein and means for advancing each heated sheet portion with the container attached therein across a stripping surface to break each container away from each heated sheet portion along the line of penetration, the improvement wherein the means for sealing and penetrating is a blade having surfaces spaced from each other defining its thickness, one of the blade surfaces being situated adjacent said mold sides, said blade having a leading thickness surface with shaped depressions formed therein which increase in depth across the thickness in a direction from the surface of the blade adjacent said mold sides to the other thickness defining blade surface whereby to form frangible tabs in said sheet abutting the periphery of a container during formation of said line of penetration, the thickness of said tabs as a result of the varying depth of the depressions being less at their joint with the container than at that with the remainder of the sheet.

2. The apparatus of claim 1 wherein the surfaces of the depressions providing said decrease in depth form an angle of from 20° to 60° with the surface of the blade adjacent said mold sides.

* * * * *